United States Patent
Tomogami et al.

(10) Patent No.: US 10,364,833 B2
(45) Date of Patent: Jul. 30, 2019

(54) FIXING BAND FOR CONSTANT-VELOCITY UNIVERSAL JOINT BOOT

(71) Applicant: NTN CORPORATION, Osaka (JP)

(72) Inventors: Shin Tomogami, Shizuoka (JP); Shinichi Takabe, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/572,604

(22) PCT Filed: Apr. 27, 2016

(86) PCT No.: PCT/JP2016/063191
§ 371 (c)(1),
(2) Date: Nov. 8, 2017

(87) PCT Pub. No.: WO2016/190042
PCT Pub. Date: Dec. 1, 2016

(65) Prior Publication Data
US 2018/0135668 A1  May 17, 2018

(30) Foreign Application Priority Data

May 27, 2015 (JP) .................................. 2015-107447

(51) Int. Cl.
*F16B 2/08* (2006.01)
*C23C 18/16* (2006.01)
(Continued)

(52) U.S. Cl.
CPC .................. *F16B 2/08* (2013.01); *C23C 2/06* (2013.01); *C23C 2/26* (2013.01); *C23C 2/40* (2013.01);
(Continued)

(58) Field of Classification Search
CPC ..... C23C 18/1633; C23C 22/00; C23C 22/82; C25D 3/565; C25D 5/48; F16B 2/08; F16D 3/84
See application file for complete search history.

(56) References Cited

U.S. PATENT DOCUMENTS

| 4,222,155 A * | 9/1980 | Oetiker ................. F16L 33/025 |
| | | 24/20 CW |
| 4,256,519 A * | 3/1981 | Yoshida ................. C21D 9/563 |
| | | 148/530 |

(Continued)

FOREIGN PATENT DOCUMENTS

| JP | 3-51925 | 8/1991 |
| JP | 04-049335 | 11/1992 |

(Continued)

OTHER PUBLICATIONS

International Search Report dated Jun. 7, 2016 in International (PCT) Application No. PCT/JP2016/063191.

(Continued)

*Primary Examiner* — Robert Sandy
*Assistant Examiner* — David M Upchurch
(74) *Attorney, Agent, or Firm* — Wenderoth, Lind & Ponack, L.L.P.

(57) ABSTRACT

Provided is a fastening band including a steel plate (111) plated with a plating layer (110) as a base material. The plating layer (110) has a self-repairing function of forming a protective film (112) on a plating peeling part with a component dissolved from the plating layer. The steel plate plated with a zinc-aluminum-magnesium alloy is used as the base material. The plating layer contains 4.0 mass % to 14.0 mass % of aluminum, 1.0 mass % to 10.0 mass % of magnesium, and the balance of zinc. The plating layer (Continued)

contains aluminum and magnesium in a total content of 15 mass % or less and zinc in a content of 85 mass % or more.

10 Claims, 9 Drawing Sheets

(51) Int. Cl.
<table>
<tr><td>C23C 22/82</td><td>(2006.01)</td></tr>
<tr><td>C25D 3/56</td><td>(2006.01)</td></tr>
<tr><td>C25D 5/48</td><td>(2006.01)</td></tr>
<tr><td>F16D 3/84</td><td>(2006.01)</td></tr>
<tr><td>C23C 22/00</td><td>(2006.01)</td></tr>
<tr><td>C23C 2/06</td><td>(2006.01)</td></tr>
<tr><td>C23C 2/26</td><td>(2006.01)</td></tr>
<tr><td>C23C 2/40</td><td>(2006.01)</td></tr>
</table>

(52) U.S. Cl.
CPC .......... *C23C 18/1633* (2013.01); *C23C 22/00* (2013.01); *C23C 22/82* (2013.01); *C25D 3/565* (2013.01); *C25D 5/48* (2013.01); *F16D 3/84* (2013.01)

(56) References Cited

U.S. PATENT DOCUMENTS

<table>
<tr><td>4,335,873</td><td>A</td><td>*</td><td>6/1982</td><td>Kiefer</td><td>B25B 5/163<br>269/228</td></tr>
<tr><td>4,908,914</td><td>A</td><td>*</td><td>3/1990</td><td>Fay</td><td>F16L 33/04<br>24/279</td></tr>
<tr><td>5,111,555</td><td>A</td><td></td><td>5/1992</td><td>Oetiker</td><td></td></tr>
<tr><td>5,186,768</td><td>A</td><td>*</td><td>2/1993</td><td>Nomoto</td><td>C21D 9/02<br>148/333</td></tr>
<tr><td>5,315,742</td><td>A</td><td>*</td><td>5/1994</td><td>Fay</td><td>F16L 33/08<br>24/274 R</td></tr>
<tr><td>5,740,589</td><td>A</td><td>*</td><td>4/1998</td><td>Palau Dominguez</td><td>F16L 33/025<br>24/19</td></tr>
<tr><td>6,247,206</td><td>B1</td><td>*</td><td>6/2001</td><td>Craig, Jr.</td><td>F16L 33/025<br>24/20 CW</td></tr>
<tr><td>8,875,354</td><td>B2</td><td>*</td><td>11/2014</td><td>Miessmer</td><td>F16L 33/025<br>24/19</td></tr>
<tr><td>9,938,807</td><td>B2</td><td>*</td><td>4/2018</td><td>Fielder, III</td><td>E21B 43/12</td></tr>
</table>

FOREIGN PATENT DOCUMENTS

<table>
<tr><td>JP</td><td>08-159108</td><td>6/1996</td></tr>
<tr><td>JP</td><td>10-226865</td><td>8/1998</td></tr>
<tr><td>JP</td><td>2003-176890</td><td>6/2003</td></tr>
<tr><td>JP</td><td>2005-290551</td><td>10/2005</td></tr>
<tr><td>JP</td><td>2011-112118</td><td>6/2011</td></tr>
<tr><td>JP</td><td>2012-237333</td><td>12/2012</td></tr>
<tr><td>JP</td><td>2012-237421</td><td>12/2012</td></tr>
<tr><td>JP</td><td>2013-36071</td><td>2/2013</td></tr>
<tr><td>JP</td><td>5188163</td><td>4/2013</td></tr>
<tr><td>JP</td><td>2014-162957</td><td>9/2014</td></tr>
</table>

OTHER PUBLICATIONS

International Preliminary Report on Patentability and Written Opinion of the International Searching Authority dated Nov. 28, 2017 in International (PCT) Application No. PCT/JP2016/063191.

* cited by examiner

FIXING BAND FOR CONSTANT-VELOCITY UNIVERSAL JOINT BOOT

TECHNICAL FIELD

The present invention relates to a fastening band configured to fasten a boot which is mounted on a fixed type constant velocity universal joint and a plunging type constant velocity universal joint to be incorporated into, for example, a drive shaft and a propeller shaft, thereby preventing entry of foreign matters from outside of the joint and leakage of a lubricant from inside of the joint.

BACKGROUND ART

As a constant velocity universal joint to be used as a unit configured to transmit rotational torque from an engine of an automobile to a wheel at a constant velocity, there are given, for example, two kinds, specifically, a fixed type constant velocity universal joint and a plunging type constant velocity universal joint. Both of the constant velocity universal joints have a structure in which two shafts on a driving side and a driven side are coupled to each other to allow rotational torque to be transmitted at a constant velocity even when each of the two shafts forms an operating angle.

In a drive shaft configured to transmit power from an engine of an automobile to a driving wheel, it is necessary to support angular displacement and axial displacement caused by a change in relative positional relationship between the engine and the wheel. Therefore, in general, the plunging type constant velocity universal joint is mounted on an engine side (inboard side), and the fixed type constant velocity universal joint is mounted on a driving wheel side (outboard side), and both of the constant velocity universal joints are coupled to each other through intermediation of an intermediate shaft.

In the plunging type constant velocity universal joint or the fixed type constant velocity universal joint, in order to prevent entry of foreign matters from outside of the joint as well as leakage of a lubricant, for example, a grease sealed in the joint, a boot is mounted between an outer joint member of the constant velocity universal joint and the intermediate shaft. This type of boot is fastened with a metallic boot band (see, for example, Patent Literatures 1 to 4) to be fixed to the outer joint member and the intermediate shaft, thereby ensuring a sealing property.

As illustrated in FIG. 7, a fastening band disclosed in Patent Literature 1 is a hose band to be used under a state in which a belt-like member 1 is rolled up into a ring shape so that both end portions thereof are overlapped on one another on an inner side and an outer side. This band includes engagement holes 2 in an outer overlapped portion 1a of the belt-like member 1, and protrusions 3 configured to be engaged with the engagement holes 2 in an inner overlapped portion 1b of the belt-like member 1. The band further includes a fastening ear portion 4 in a part of the belt-like member 1 in a longitudinal direction thereof. Further, a distal end portion 5 of the inner overlapped portion 1b is formed into a tapered shape having a reduced thickness on the distal end side, and a punched hole or a cutaway hole is formed in the distal end portion 5. The diameter of the band is reduced by plastically deforming the ear portion 4.

As illustrated in FIG. 8, a band described in Patent Literature 2 has the following configuration. A metallic band 6 having a band shape is rolled up so that both end portions thereof are overlapped on one another. Engagement holes 9 and a caulking protrusion 7 that rises in a radially outward direction through bending are formed in an outer overlapped portion 6a of the band 6, and cut and raised protrusions 10 configured to be engaged with the engagement holes 9 are formed in an inner overlapped portion 6b of the band 6. Further, a protrusion 11 that is opposed to a distal end of the inner overlapped portion 6b at an interval corresponding to the caulking amount of the caulking protrusion 7 is formed on an inner surface of the outer overlapped portion 6a so that the inner surface of the protrusion 11 is connected to a cylindrical inner surface of the band 6, and the height of the protrusion 11 at the distal end is set to be equal to or more than the thickness of the band 6. Also in this case, the diameter of the band 6 is reduced by plastically deforming the caulking protrusion 7.

As illustrated in FIG. 9A, a band described in Patent Literature 3 has the following configuration. Engagement claws 16 and a first tool claw 17 are formed in an inner overlapped portion 15b of a belt-like member 15, and engagement holes 19 and a second tool claw 20 are formed in an outer overlapped portion 15a of the belt-like member 15. As illustrated in FIG. 9B, the first tool claw 17 and the second tool claw 20 are forcibly brought into close to each other to engage the engagement claws 16 and the engagement holes 19 with each other.

As illustrated in FIG. 10A and FIG. 10B, a band disclosed in Patent Literature 4 includes temporary retaining protrusions 22 configured to keep a temporary retained state in which a belt-like member 15 is wound around an outer periphery of a boot and a lock protrusion 23 configured to keep a fastened state of the belt-like member 15 fastened in a diameter reducing direction from the temporary retained state. Further, protruding portions 24 configured to regulate freewheeling of the belt-like member 15 with respect to the boot are formed along a length direction of an inner overlapped portion. Also in this case, the diameter of the band is reduced by forcibly bringing a first tool claw 17 formed in an inner overlapped portion 15b and a second tool claw 20 formed in an outer overlapped portion 15a into close to each other.

CITATION LIST

Patent Literature 1: JP 03-51925 B
Patent Literature 2: JP 08-159108 A
Patent Literature 3: JP 2012-237333 A
Patent Literature 4: JP 2012-237421 A

SUMMARY OF INVENTION

Technical Problem

Incidentally, materials (raw materials) for the bands described in the above-mentioned literatures are as follows. In Patent Literature 1, a metal, for example, stainless steel is used. In Patent Literatures 2 and 3, the metallic bands are described. In Patent Literature 4, there is no description of the material (raw material).

When stainless steel is used as described in Patent Literature 1, the band becomes excellent in corrosion resistance and is stable, but cost is increased. Further, the metals described in Patent Literatures 2 and 3 are not particularly specified. As such metals, a plated steel plate is conceivable in consideration of strength and corrosivity. However, when a generally known plated steel plate is used, a base material is cut and formed for processing a fastening band. Therefore, a cut end surface portion is exposed, and this portion is corroded, with the result that the resultant band has unsatisfactory corrosion resistance. That is, when a plated steel plate is used, plating peels during cutting or pressing, and the peeling part is oxidized (rusted). Further, when the fastening band after being processed is subjected to plating treatment or coating treatment, cost is increased. In addition, in a fastening band of a type in which protrusions are engaged with engagement holes, plating or coating of contact portions between the engagement holes and the protrusions peels, with the result that the resultant fastening band has unsatisfactory corrosion resistance.

In view of the foregoing, the present invention provides a fastening band for a constant velocity universal joint boot, which is capable of ensuring a required sealing property, rust preventiveness, and corrosion resistance and of reducing cost.

Solution to Problem

According to one embodiment of the present invention, there is provided a fastening band for a constant velocity universal joint boot, comprising a steel plate plated with a plating layer as a base material, the plating layer having a self-repairing function of forming a protective film on a plating peeling part with a component dissolved from the plating layer.

In the fastening band for a constant velocity universal joint boot, the plating layer has the self-repairing function and can cover the plating peeling part with the protective film formed of the component dissolved from the plating layer.

It is preferred that the fastening band for a constant velocity universal joint boot comprise a steel plate plated with a zinc-aluminum-magnesium alloy as the base material. In this case, the aluminum-magnesium is dissolved and a dense zinc-based protective film containing aluminum-magnesium is formed as a protective film.

In this case, the plating layer may contain 4.0 mass % to 14.0 mass % of aluminum, 1.0 mass % to 10.0 mass % of magnesium, and the balance of zinc. Further, the plating layer may contain aluminum and magnesium in a total content of 15 mass % or less and zinc in a content of 85 mass % or more.

The fastening band for a constant velocity universal joint boot may comprise a belt-like member that is rolled up into a ring shape so that both end portions of the belt-like member are overlapped on one another, the belt-like member having: an engagement hole formed in an outer part of an overlapped portion of the belt-like member; a protrusion, which is configured to be engaged with the engagement hole, and is formed in an inner part of the overlapped portion of the belt-like member; and a fastening ear portion formed in a part of the belt-like member.

The fastening band for a constant velocity universal joint boot may comprise a belt-like member that is rolled up into a ring shape so that both end portions of the belt-like member are overlapped on one another, the belt-like member having: an engagement claw and a first tool claw formed on one end side of the belt-like member; and an engagement hole and a second tool claw formed on the other end side of the belt-like member, wherein the engagement claw is engaged with the engagement hole by rolling up the belt-like member into a ring shape so that both the end portions are overlapped on one another, and then bringing the first tool claw and the second tool claw into close to each other to reduce a diameter of the belt-like member.

It is preferred that the steel plate to be used have mechanical properties of a tensile strength of 270 MPa or more and an elongation at fracture of 30% or more. When the tensile strength is less than 270 MPa, and the elongation at fracture is less than 30%, there is a risk in that, when a constant velocity universal joint boot is fastened, the fastening band may be fractured with the fastening force.

Advantageous Effects of Invention

According to the present invention, when the plating layer peels from a cut end surface portion or an engagement contact part, the cut end surface portion or the engagement contact part, which is exposed to outside, can be covered with the protective film formed of the component dissolved from the plating layer, and hence excellent rust preventiveness and corrosion resistance are exhibited.

In particular, when the plating layer contains 4.0 mass % to 14.0 mass % of aluminum, 1.0 mass % to 10.0 mass % of magnesium, and the balance of zinc, a dense zinc-based protective film containing aluminum and magnesium covers the plating peeing part.

As the fastening band, various existing forms, for example, a so-called omega band having a caulking protrusion (fastening ear portion) and a hook band in which protrusions are engaged with engagement holes can be used. Those bands can be mounted by a mounting method similar to that for a related-art fastening band without the need for adopting a special mounting method at the time of use.

Through setting of the mechanical properties of the steel plate to a tensile strength of 270 MPa or more and an elongation at fracture of 30% or more, when the constant velocity universal joint boot is fastened with the fastening band, the constant velocity universal joint boot can be fixed with stable fastening force.

DESCRIPTION OF EMBODIMENTS

Figure 1A:
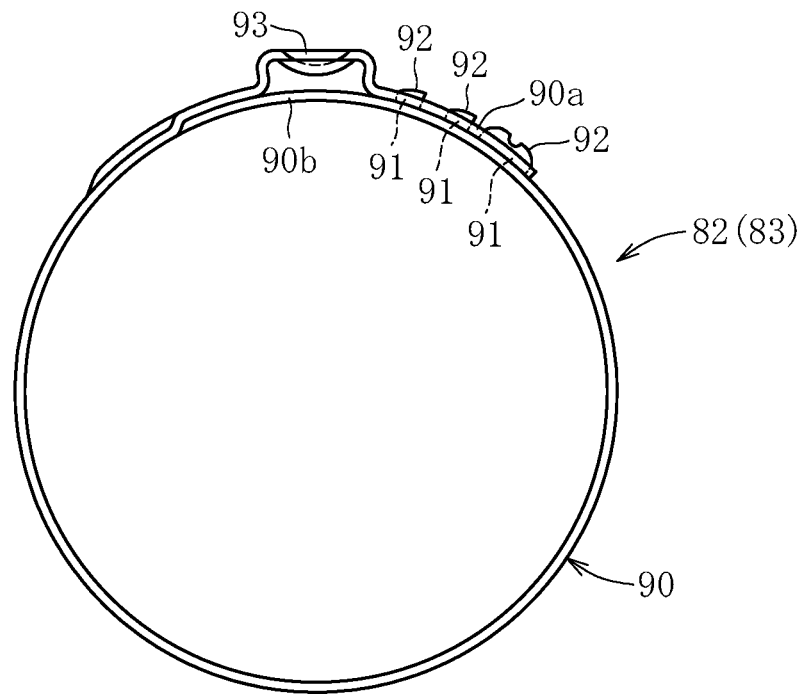
FIG. 1A is a side view of a first fastening band of the present invention before being fastened under a state of being rolled up into a ring shape.
Figure 1B:
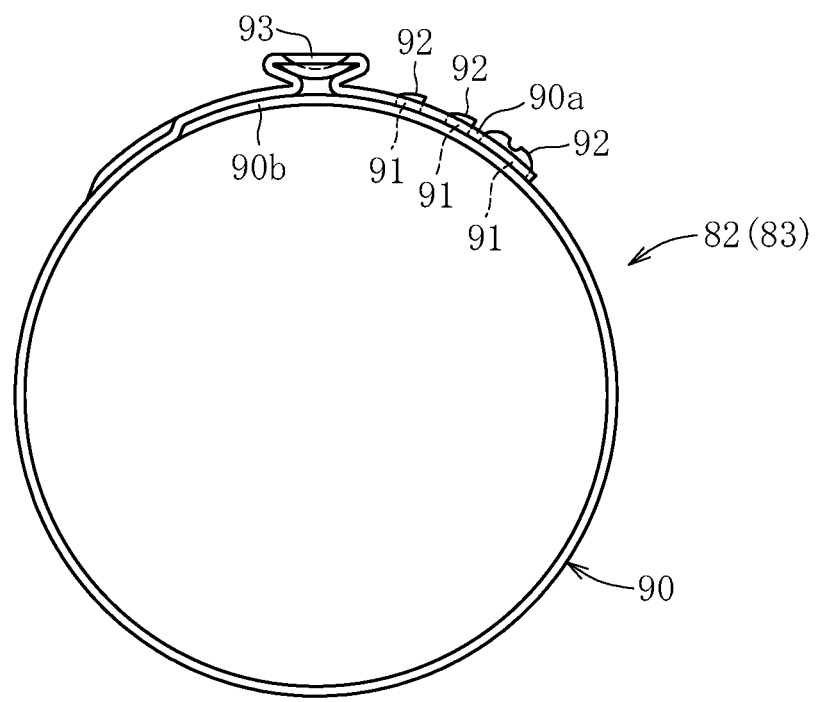
FIG. 1B is a side view of the first fastening band of the present invention after being fastened under a state of being rolled up into a ring shape.
Figure 2A:
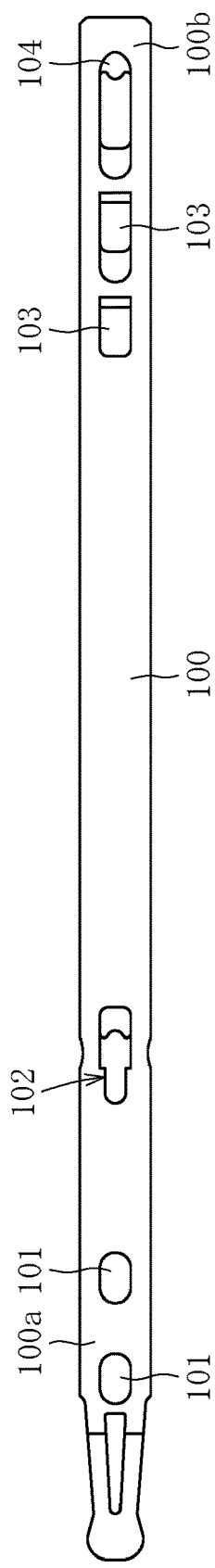
FIG. 2A is a plan view of a second fastening band of the present invention before being rolled up into a ring shape.
Figure 2B:
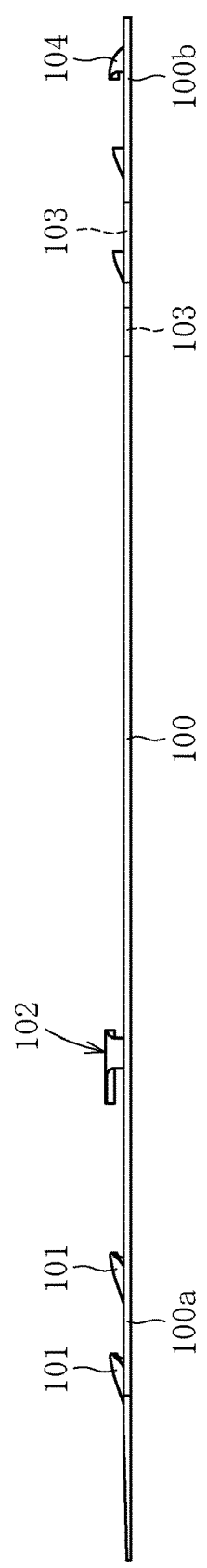
FIG. 2B is a side view of the second fastening band of the present invention before being rolled up into a ring shape.

Now, an embodiment of the present invention is described with reference to FIG. 1A to FIG. 6C. FIG. 5 is a view of a drive shaft using a fastening band for a constant velocity universal joint boot according to the present invention, which is illustrated in FIG. 1A and FIG. 1B. The drive shaft comprises a fixed type constant velocity universal joint 51, a plunging type constant velocity universal joint 52, and a shaft 50 configured to connect those constant velocity universal joints. In the illustrated example, a Barfield-type constant velocity universal joint is used as the fixed type constant velocity universal joint 51, and a tripod type constant velocity universal joint is used as the plunging type constant velocity universal joint 52.

The fixed type constant velocity universal joint 51 comprises an outer joint member 55, an inner joint member 58, a plurality of balls 59, and a cage 60. The outer joint member 55 includes an inner spherical surface 54 having a plurality of tracks 53 extending in an axial direction. The inner joint member 58 includes an outer spherical surface 57 having a plurality of tracks 56 extending in the axial direction. The plurality of balls 59 are interposed between the tracks 53 of the outer joint member 55 and the tracks 56 of the inner joint member 58 to transmit a torque. The cage 60 is interposed between the inner spherical surface 54 of the outer joint member 55 and the outer spherical surface 57 of the inner joint member 58 to retain the balls 59.

The plunging type constant velocity universal joint 52 comprises an outer joint member 62, a tripod member 64, and rollers 65. The outer joint member 62 has three grooves 61 extending in an axis direction in an inner periphery, and roller guide surfaces 61a opposed to each other are formed on inner walls of the grooves 61. The tripod member 64 serving as an inner joint member comprises three journals 63 protruding in a radial direction. The rollers 65 each serving as a torque transmission unit are supported on the journals 63 so as to be rotatable and are inserted to the grooves 61 of the outer joint member so as to be rollable. In this case, the rollers 65 are externally fitted onto radially outer surfaces of the journals 63 through intermediation of a plurality of rollers 66 which are arranged along a circumferential direction. The tripod member 64 comprises a boss portion 67 and the journals 63 extending in a radial direction from the boss portion 67.

The shaft 50 has male splines 50a and 50b formed at both end portions of the shaft 50. One male spline 50a is fitted into the inner joint member 58 of the fixed type constant velocity universal joint 51, and another male spline 50b is fitted into the tripod member 64 of the plunging type constant velocity universal joint 52. A female spline 72 is formed in an axial center hole 71 of the inner joint member 58, and the one male spline 50a of the shaft 50 is fitted into the axial center hole 71 of the inner joint member 58 and is brought into mesh with the female spline 72. Further, the another male spline 50b of the shaft 50 is fitted into an axial center hole 73 of the boss portion 67 of the tripod member 64 and is brought into mesh with a female spline 74 of the axial center hole 73.

A boot 80A configured to seal an opening portion of the outer joint member 55 is provided to the fixed type constant velocity universal joint 51. A boot 80B configured to seal an opening portion of the outer joint member 62 is provided to the plunging type constant velocity universal joint 52. Each of the boots 80A and 80B comprises a large-diameter mounting portion 80a, a small-diameter mounting portion 80b, and a bellows portion 80c which constructs a bent portion which connects the large-diameter mounting portion 80a and the small-diameter mounting portion 80b to each other. The large-diameter mounting portions 80a of the boots 80A and 80B are fastened and fixed by fastening bands 82 (82A and 82B) at boot receiving portions 85 and 85 formed in the radially outer surfaces on the opening portion sides of the outer joint members 55 and 62, respectively. The small-diameter mounting portions 80b of the boots 80A and 80B are fastened and fixed by fastening bands 83 (83A and 83B) at predetermined portions (boot receiving portions 86 and 86) of the shaft 50, respectively.

As the fastening band 82(83), various types illustrated in FIG. 1A to FIG. 4 can be used. The first fastening band 82(83) illustrated in FIG. 1A and FIG. 1B comprises a belt-like (i.e., belt-shaped) member 90 that is rolled up into a ring shape so that both end portions are overlapped on one another. Engagement holes 91 are formed in an outer part 90a of an overlapped portion of the belt-like member 90, and protrusions 92 configured to be engaged with the engagement holes 91 are formed in an inner part 90b of the overlapped portion of the belt-like member 90. Further, a fastening ear portion 93 is formed in a part of the belt-like member 90.

Therefore, as illustrated in FIG. 1A, when the ear portion 93 is caulked as illustrated in FIG. 1B under a state in which the belt-like member 90 is rolled up into a ring shape as illustrated in FIG. 1A, the diameter of the belt-like member 90 rolled up into a ring shape is reduced, and the protrusions 92 are engaged with the engagement holes 91, with the result that the first fastening band 82 (83) can be mounted on the outer joint members 55 and 62 of the constant velocity universal joints 51 and 52 and the shaft 50 under a state in which the large-diameter mounting portion 80a and the small-diameter mounting portion 80b are fastened.

The fastening band 82(83) illustrated in FIG. 2A, FIG. 2B, FIG. 3A, and FIG. 3B corresponds to a second fastening band. The second fastening band 82(83) comprises a belt-like (i.e., belt-shaped) member 100 that is rolled up into a ring shape so that both end portions are overlapped on one another. Engagement claws 101 and a first tool claw 102 are formed in one end portion 100a of the belt-like member 100, and engagement holes 103 and a second tool claw 104 are formed in the other end portion 100b of the belt-like member 100.

Figure 3A:
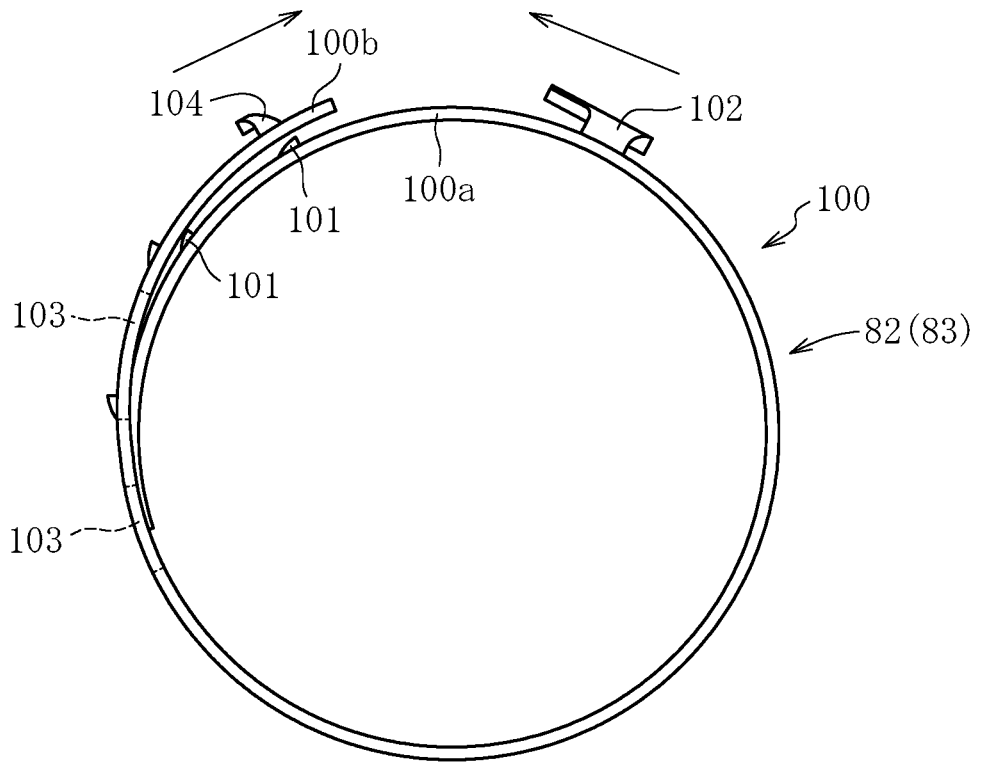
FIG. 3A is a side view of the second fastening band of the present invention before being fastened under a state of being rolled up into a ring shape.
Figure 3B:
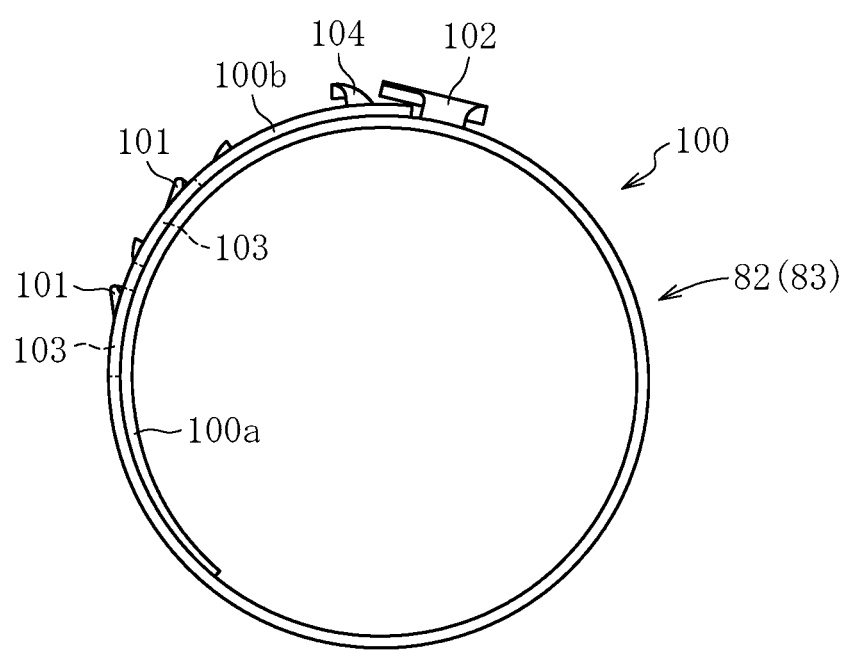
FIG. 3B is a side view of the second fastening band of the present invention after being fastened under a state of being rolled up into a ring shape.

As illustrated in FIG. 3A, the belt-like member 100 is wound into a ring shape around a boot so that the one end portion and the other end portion of the belt-like member 100 are overlapped on one another. In this state, as illustrated in FIG. 3B, the first tool claw 102 and the second tool claw 104 are forcibly brought into close to each other with a tool (not shown) to fit the engagement claws 101 into the engagement holes 103, to thereby lock the engagement claws 101 and the engagement holes 103 on each peripheral edge portion. With this, boots 80A and 80B are fastened to be fixed to the outer joint members 55 and 62 of the constant velocity universal joints 51 and 52 and the shaft 50.

Figure 4:
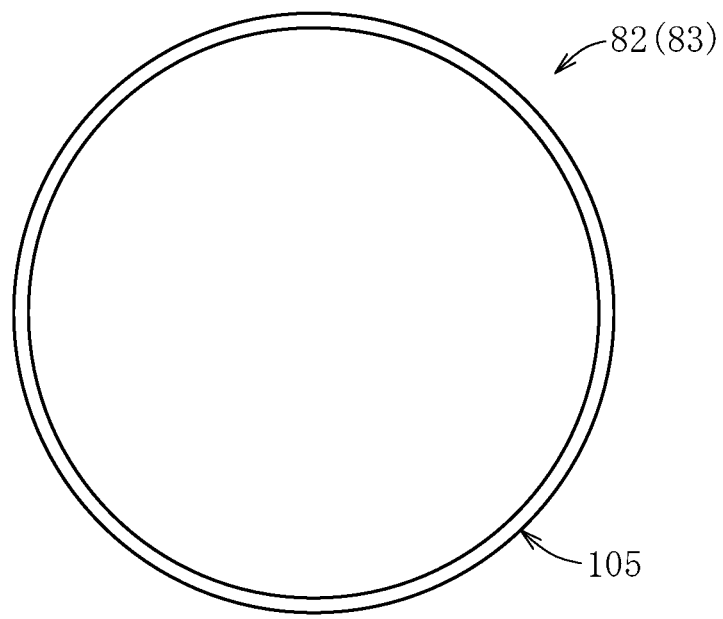
FIG. 4 is a side view of a third fastening band of the present invention.
Figure 5:
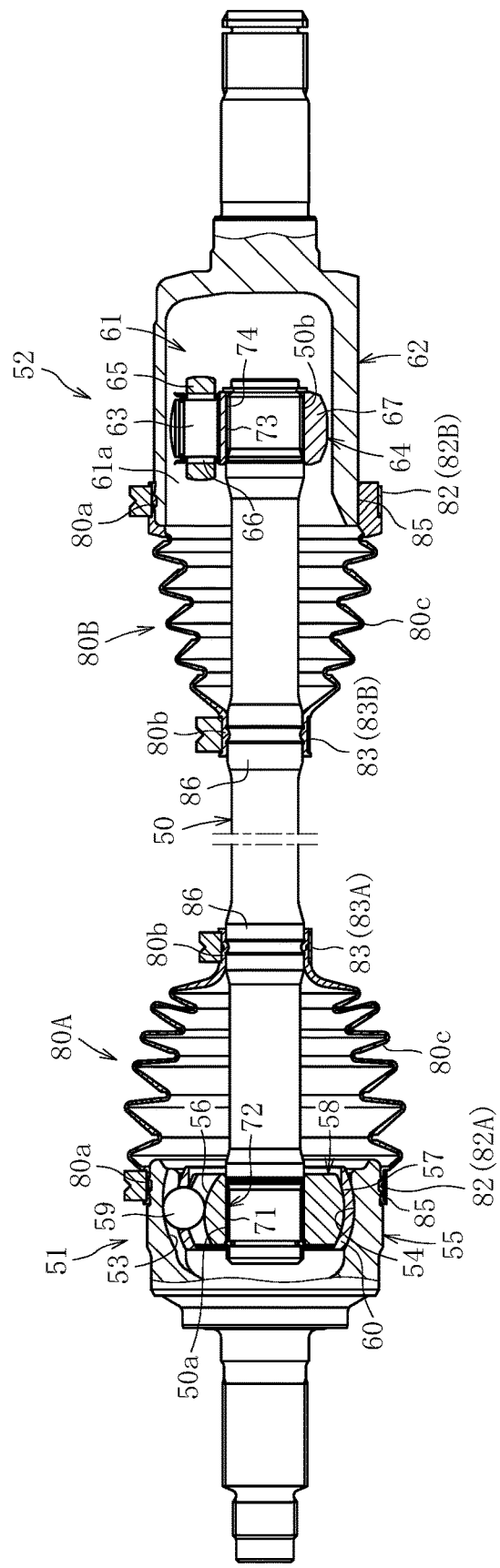
FIG. 5 is a sectional view of a drive shaft.

Further, a fastening band illustrated in FIG. 4 is a so-called annular band 105 and is formed by joining annular bands.

Figure 6A:
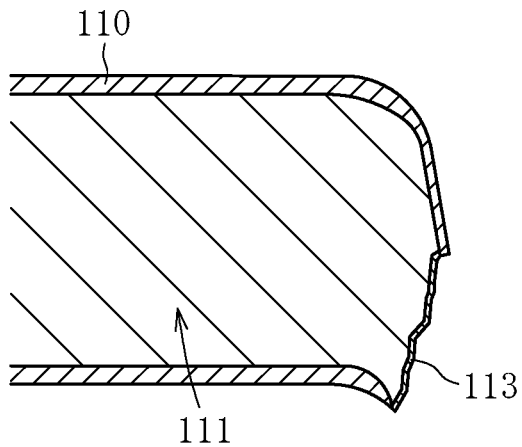
FIG. 6A is an enlarged sectional view for illustrating an action of a plating layer under a state in which the plating layer peels from a cut end surface portion.
Figure 6B:
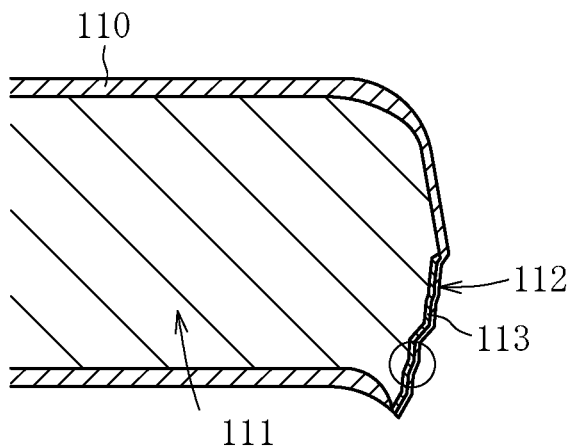
FIG. 6B is a sectional view for illustrating the action of the plating layer under a state in which a protective film is formed on the cut end surface portion.
Figure 6C:
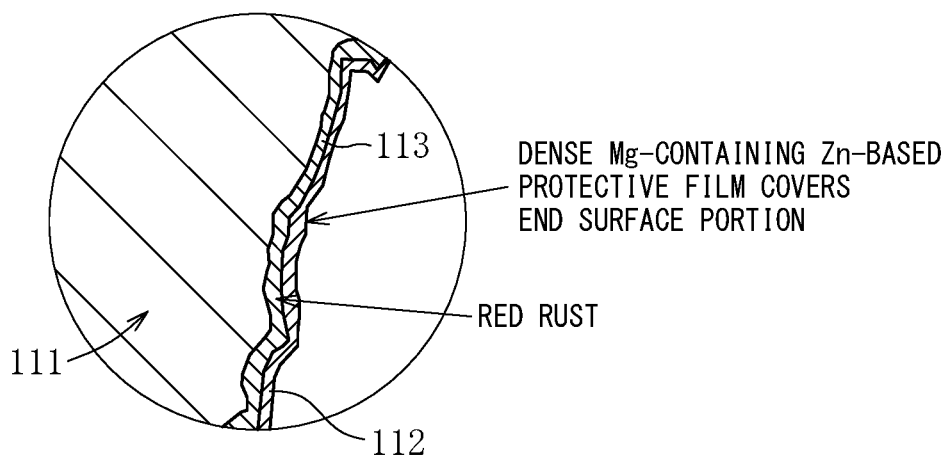
FIG. 6C is an enlarged sectional view of main portions of FIG. 6B.
Figure 7:
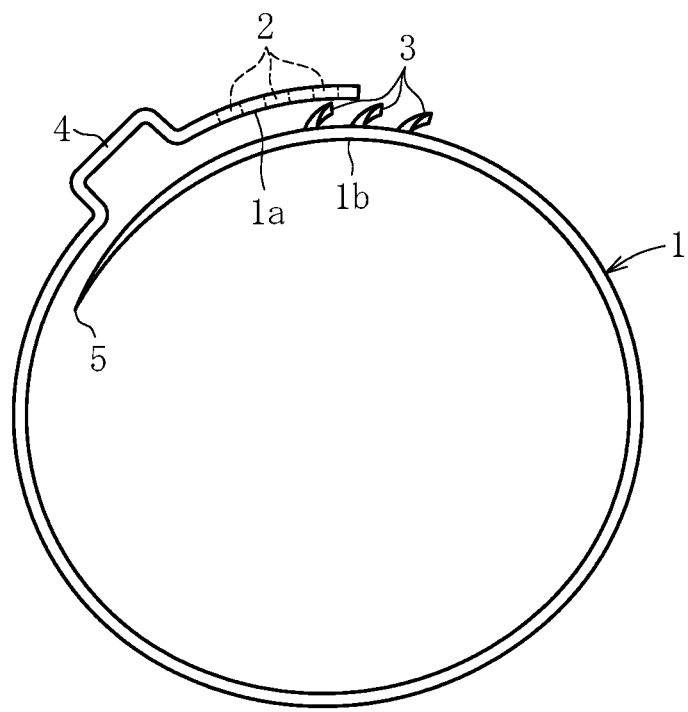
FIG. 7 is a side view of a first related-art fastening band.
Figure 8:
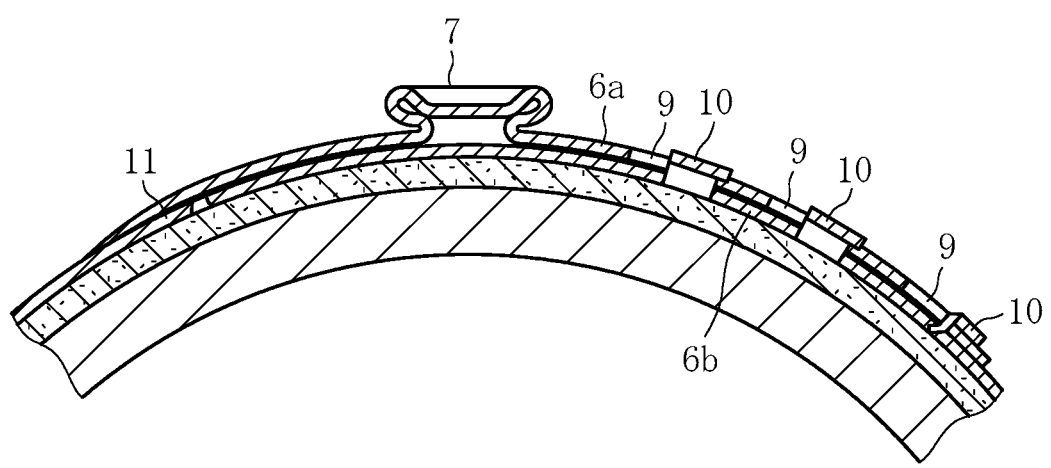
FIG. 8 is a side view of a second related-art fastening band.
Figure 9A:
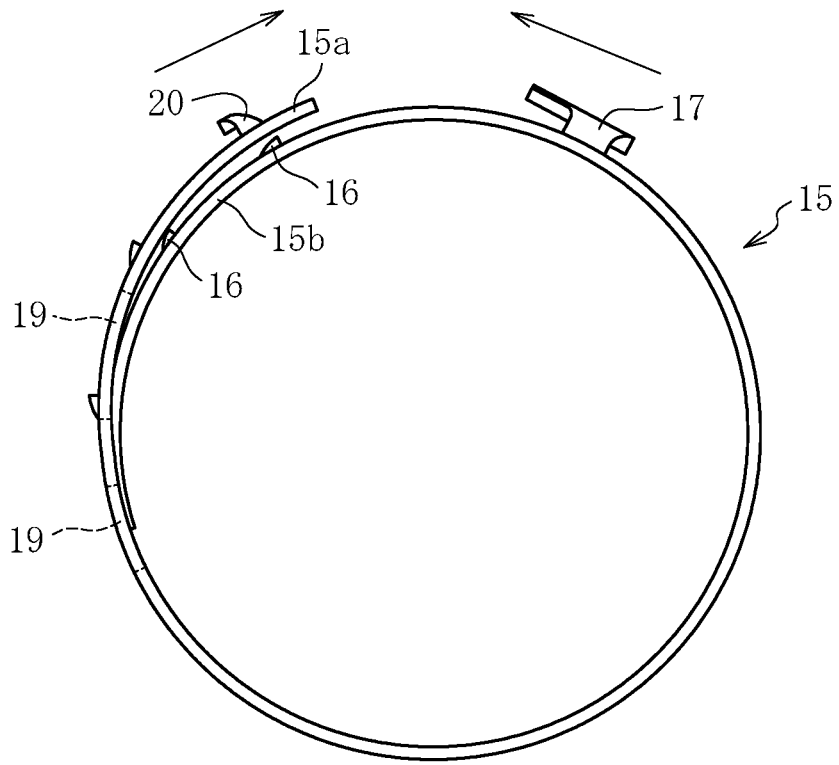
FIG. 9A is a side view for illustrating a third related-art fastening band before being fastened.
Figure 9B:
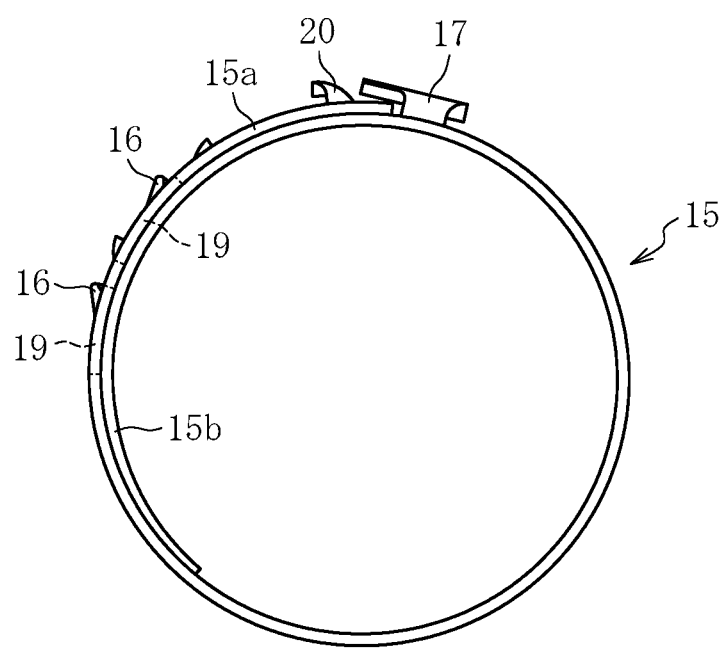
FIG. 9B is a side view for illustrating the third related-art fastening band after being fastened.
Figure 10A:
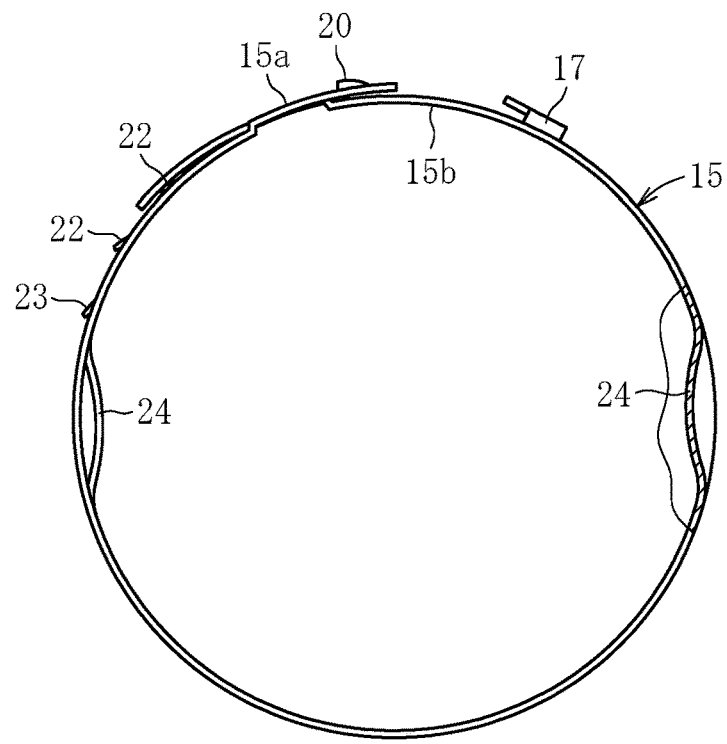
FIG. 10A is a side view for illustrating a fourth related-art fastening band before being fastened.
Figure 10B:
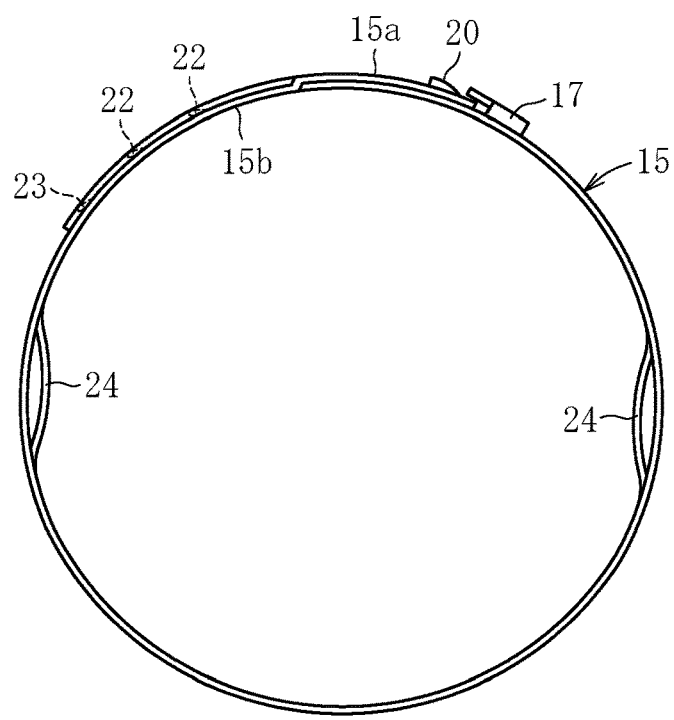
FIG. 10B is a side view for illustrating the fourth related-art fastening band after being fastened.

In the invention of the present application, as the fastening band, a steel plate 111 plated with a plating layer 110 is used as a base material as illustrated in FIG. 6A to FIG. 6C. That is, in the fastening band illustrated in FIG. 1A and FIG. 1B, the steel plate 111 in which the belt-like member 90 is plated with the plating layer is used. In the fastening band illustrated in FIG. 2A to FIG. 3B, the steel plate 111 in which the belt-like member 100 is plated with the plating layer is used. In the fastening band illustrated in FIG. 4, the steel plate 111 in which the annular bands to be joined are plated with the plating layers is used.

When a plating peeling part (cut end surface portion or the like) is formed on the plating layer 110, the plating peeling part is oxidized to cause rust 113 as illustrated in FIG. 6A. However, the plating layer 110 forms a protective film 112 with a component dissolved from the plating layer 110 on the cut end surface portion (plating peeling part) as illustrated in FIG. 6B and FIG. 6C. As described above, the plating layer 110 has a self-repairing property. The plating peeling part as used herein refers to, for example, the cut end surface portion obtained by cutting the base material for processing the fastening band, a part in which plating peels during pressing, and a contact part in which an protrusion is brought into contact with an engagement hole in the case where the protrusion is engaged with the engagement hole.

Therefore, in the present invention, the plating peeling parts such as the cut end surface portion and the engagement contact part, which are exposed to outside, can be covered with the protective film formed of the component dissolved from the plating layer 110, and hence excellent rust preventiveness and corrosion resistance are exhibited.

The plating layer 110 is formed of, for example, ZAM (trademark of Nisshin Steel Co., Ltd.) in which aluminum and magnesium are added to zinc. That is, it is possible to use a steel plate and a steel strip (hereinafter referred to as "plate and coil") subjected to hot dipping with an equal thickness on both surfaces in a plating bath containing, in terms of mass fraction defined by JIS G 3316, 5.0% to 13.0% of aluminum, 2.0% to 4.0% of magnesium, other elements in a total content of 1.0% or less, and the balance of zinc.

That is, the plating layer 110 is formed of a zinc-aluminum-magnesium alloy, and in the invention of the present application, the plating layer 110 contains 4.0 mass % to 14.0 mass % of aluminum, 1.0 mass % to 10.0 mass % of magnesium, and the balance of zinc. It is preferred that the content of aluminum and magnesium be set to 15 mass % or less, and the content of zinc be set to 85 mass % or more.

When the plating layer 110 contains 4.0 mass % to 14.0 mass % of aluminum, 1.0 mass % to 10.0 mass % of magnesium, and the balance of zinc, a dense zinc-based protective film containing aluminum and magnesium covers the cut end surface portion. Therefore, extremely excellent rust preventiveness and corrosion resistance are exhibited. When the content of aluminum and magnesium is set to 15 mass % or less, and the content of zinc is set to 85 mass % or more, a zinc-based protective film can be formed stably.

The plating layer may contain silicon, titanium, and boron. In this case, it is preferred that the content of silicon be set to 0.3 mass % or less, the content of titanium be set to 0.1 mass % or less, and the content of boron be set to 0.05 mass % or less.

Magnesium contained in the plating layer has an effect of forming a zinc-based corrosion product containing magnesium on an outermost layer of the plating layer and reducing the corrosion speed of the plating layer together with aluminum in the plating layer. This action is performed as described below. The zinc-based corrosion product containing magnesium is present on the plating layer stably for a long period of time to suppress the formation of zinc oxide that degrades corrosion resistance.

Zinc and magnesium in the plating layer form a zinc-based corrosion product containing magnesium, and aluminum in the plating layer forms a zinc-aluminum-based corrosion product having an extremely strong sticking property, thereby contributing to improvement of corrosion resistance. Further, when the plating layer contains aluminum, a zinc/aluminum/$Zn_2Mg$ ternary eutectic appears in a solidified structure of the plating layer. The ternary eutectic structure is finer than a zinc/$Zn_2Mg$ binary eutectic structure, and hence the ternary eutectic structure is more preferred also from the viewpoints of corrosion resistance and the hardness of the plating layer.

When the plating layer contains titanium and boron, the generation of a $Zn_{11}Mg_2$ phase that impairs an outer appearance of the surface is suppressed by virtue of the addition of Ti and B, and a Zn—Mg-based intermetallic compound that is crystallized into the plating layer can be substantially limited to $Zn_2Mg$. Specifically, when the plating layer contains 0.001 mass % or more of Ti, the generation of a $Zn_{11}Mg_2$ phase can be effectively suppressed. However, when the content of Ti is more than 0.1 mass %, a Ti—Al-based precipitate grows in the plating layer to cause irregularities (nodules) in the plating layer, with the result that the outer appearance is impaired. It is preferred that the content of Ti be set to 0.002 mass % or more. Further, when the plating layer contains 0.001 mass % or more of B, the generation of the $Zn_{11}Mg_2$ phase can be effectively suppressed. However, when the content of B is more than 0.05 mass %, a Ti—B-based precipitate and an AlB-based precipitate grow in the plating layer to cause irregularities in the plating layer, with the result that the outer appearance is impaired. It is preferred that the content of B be set to 0.001 mass % or more. Further, silicon has an action of suppressing the growth of an Al—Fe alloy layer at an interface between the plating layer and base steel. In this case, it is preferred that the content of silicon be set to 0.3 mass % or less.

As mechanical properties of the steel plate, a tensile strength of 270 MPa or more and an elongation at fracture of 30% or more are preferred. Through this setting, when the constant velocity universal joint boot is fastened with the fastening band, the constant velocity universal joint boot can be fixed with stable fastening force.

As the fastening band 82 (83), various existing forms, for example, a so-called omega band having a caulking protrusion (fastening ear portion 93) and a hook band in which the engagement claws 101 are engaged with the engagement holes 103 can be used. Those bands can be mounted by a mounting method similar to that for a related-art fastening band without the need for adopting a special mounting method at the time of use.

It is preferred that, after the plating layer 110 is formed, the plating layer 110 be subjected to chemical conversion treatment as post treatment through use of a chromium-free film component, such as an inorganic film component, an organic film component, or phosphoric acid. Through the above-mentioned chemical conversion treatment, corrosion resistance is further improved, and processability, for example, flaw prevention and adhesiveness after coating are improved. In particular, the inorganic film component is excellent in corrosion resistance and processability.

The embodiment of the present invention is described above. However, the present invention is not limited to the above-mentioned embodiment and can be variously modified. The constant velocity universal joint boot may be a rubber boot made of, for example, chloroprene rubber, urethane rubber, chlorinated polyethylene rubber, acrylic ethylene rubber, or silicone rubber, or may be a resin boot made of, for example, a polyester-based thermoplastic elastomer.

Further, the material is not limited to the ZAM material, and other zinc-plated steel plates maybe used. That is, zinc (Zn) contained in the plating layer has an ionization tendency larger than that of iron (Fe), and hence it is only necessary that, in a corrosion environment, for example, water, Zn be dissolved earlier than Fe to prevent the corrosion of Fe forming an original plate. As a method for plating treatment, for example, various well-known methods of the related art, such as electroplating and electroless plating, may be adopted.

INDUSTRIAL APPLICABILITY

As the constant velocity universal joint, any of a constant velocity universal joint to be used in a drive shaft and a constant velocity universal joint to be used in a propeller shaft may be used. Further, the fixed type constant velocity universal joint is not limited to a Rzeppa type or a Birfield type, but may be an undercut-free type. The plunging type constant velocity universal joint is not limited to a tripod type, but may be a double-offset type, a cross-groove type, or the like. Further, in the case of the tripod type constant velocity universal joint, the universal joint may be any of a single roller type and a double roller type.

REFERENCE SIGNS LIST 90 belt-like member
91 engagement hole
92 protrusion
93 ear portion
100 belt-like member
101 engagement claw
102, 104 tool claw
103 engagement hole
105 annular band
110 plating layer
111 steel plate
112 protective film

The invention claimed is:

1. A fastening band for a constant velocity universal joint boot, the fastening band comprising a steel plate plated with a plating layer as a base material,
   the plating layer being a zinc-aluminum-magnesium alloy in which aluminum and magnesium are added to zinc, and having a composition in which aluminum is contained by 4.0 to 14.0 mass % and magnesium is set to 1.0 to 10.0 mass %, thereby
   the plating layer has a self-repairing function of forming a zinc series protective film containing aluminum and magnesium on a plating peeling part with a component dissolved from the plating layer.

2. The fastening band for a constant velocity universal joint boot according to claim 1, wherein the plating layer comprises aluminum and magnesium in a total content of 15 mass % or less and zinc in a content of 85 mass % or more.

3. The fastening band for a constant velocity universal joint boot according to claim 1, further comprising a belt-shaped member including the steel plate plated with the plating layer that is rolled up into a ring shape so that both end portions of the belt-shaped member are overlapped on one another,
   the belt-shaped member having:
      an engagement hole formed in an outer part of an overlapped portion of the belt-shaped member;
      a protrusion, which is configured to be engaged with the engagement hole, and is formed in an inner part of the overlapped portion of the belt-shaped member; and
      a fastening ear portion formed in a part of the belt-shaped member.

4. The fastening band for a constant velocity universal joint boot according to claim 1, further comprising a belt-shaped member including the steel plate plated with the plating layer that is rolled up into a ring shape so that both end portions of the belt-shaped member are overlapped on one another,
   the belt-shaped member having:
      an engagement claw and a first tool claw formed on one end side of the belt-shaped member; and
      an engagement hole and a second tool claw formed on another end side of the belt-shaped member,
   wherein the engagement claw is engaged with the engagement hole by rolling up the belt-shaped member into a ring shape so that both the end portions are overlapped on one another, and then bringing the first tool claw and the second tool claw into close to each other to reduce a diameter of the belt-shaped member.

5. The fastening band for a constant velocity universal joint boot according to claim 1, wherein the steel plate to be used has mechanical properties of a tensile strength of 270 MPa or more and an elongation at fracture of 30% or more.

6. The fastening band for a constant velocity universal joint boot according to claim 2, further comprising a belt-shaped member including the steel plate plated with the plating layer that is rolled up into a ring shape so that both end portions of the belt-shaped member are overlapped on one another,
   the belt-shaped member having:
      an engagement hole formed in an outer part of an overlapped portion of the belt-shaped member;
      a protrusion, which is configured to be engaged with the engagement hole, and is formed in an inner part of the overlapped portion of the belt-shaped member; and
      a fastening ear portion formed in a part of the belt-shaped member.

7. The fastening band for a constant velocity universal joint boot according to claim 2, further comprising a belt-shaped member including the steel plate plated with the plating layer that is rolled up into a ring shape so that both end portions of the belt-shaped member are overlapped on one another,
   the belt-shaped member having:
      an engagement claw and a first tool claw formed on one end side of the belt-shaped member; and
      an engagement hole and a second tool claw formed on another end side of the belt-shaped member,
   wherein the engagement claw is engaged with the engagement hole by rolling up the belt-shaped member into a ring shape so that both the end portions are overlapped on one another, and then bringing the first tool claw and the second tool claw into close to each other to reduce a diameter of the belt-shaped member.

8. The fastening band for a constant velocity universal joint boot according to claim 2, wherein the steel plate to be used has mechanical properties of a tensile strength of 270 MPa or more and an elongation at fracture of 30% or more.

9. The fastening band for a constant velocity universal joint boot according to claim 3, wherein the steel plate to be used has mechanical properties of a tensile strength of 270 MPa or more and an elongation at fracture of 30% or more.

10. The fastening band for a constant velocity universal joint boot according to claim 4, wherein the steel plate to be used has mechanical properties of a tensile strength of 270 MPa or more and an elongation at fracture of 30% or more.

* * * * *